(12) United States Patent
An (10) Patent No.: US 12,371,040 B2
(45) Date of Patent: Jul. 29, 2025

(54) VEHICLE AND METHOD OF CONTROLLING THE SAME

(71) Applicants: HYUNDAI MOTOR COMPANY, Seoul (KR); KIA CORPORATION, Seoul (KR)

(72) Inventor: Chiyoung An, Cheongju-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 459 days.

(21) Appl. No.: 17/473,982

(22) Filed: Sep. 13, 2021

(65) Prior Publication Data

US 2022/0126854 A1  Apr. 28, 2022

(30) Foreign Application Priority Data

Oct. 26, 2020  (KR) .................. 10-2020-0139453

(51) Int. Cl.
*B60W 50/14* (2020.01)
*B60W 40/09* (2012.01)

(52) U.S. Cl.
CPC ............ *B60W 50/14* (2013.01); *B60W 40/09* (2013.01); *B60W 2050/143* (2013.01); *B60W 2420/403* (2013.01); *B60W 2540/229* (2020.02)

(58) Field of Classification Search
None
See application file for complete search history.

(56) References Cited

U.S. PATENT DOCUMENTS

| | | | | |
|---|---|---|---|---|
| 9,789,878 B2 * | 10/2017 | Lee | ........................ | B60K 28/06 |
| 10,246,014 B2 * | 4/2019 | Levkova | .................. | B60Q 9/00 |
| 11,667,299 B2 * | 6/2023 | Memani | ................. | G06Q 40/08 |
| | | | | 701/29.6 |
| 2018/0178808 A1 * | 6/2018 | Zhao | ..................... | B60W 40/08 |

(Continued)

FOREIGN PATENT DOCUMENTS

| CN | 110728824 A * | 1/2020 | ............ G08B 21/06 |
|---|---|---|---|
| KR | 2015-0131634 A | 11/2015 | |

(Continued)

OTHER PUBLICATIONS

Machine translation of CN-110728824-A from Espacenet (included with original version) (Year: 2023).*

*Primary Examiner* — Navid Z. Mehdizadeh
*Assistant Examiner* — Sarah A. Mueller
(74) *Attorney, Agent, or Firm* — MCDONNELL BOEHNEN HULBERT & BERGHOFF LLP (57) ABSTRACT

A vehicle for determining a risk state of the user by classifying the state of a user into a plurality of stages includes a communicator configured to receive sleeping time data of a user and terminal usage data of the user from a user terminal, a first sensor configured to acquire image data regarding a surrounding of the vehicle, a second sensor configured to acquire driving time data of the vehicle and heading direction data of the vehicle, an alarm, and a controller. The controller is configured to acquire relax data of the user, calculate a risk value, classify a fatigue state of the user, identify a plurality of vehicle driving states, and assign a different weight to each of the vehicle driving states according to the risk type to determine whether the user is in a risk state, and if so, provide a risk alarm.

16 Claims, 8 Drawing Sheets

(56) References Cited

U.S. PATENT DOCUMENTS

| | | | |
|---|---|---|---|
| 2020/0198645 A1* | 6/2020 | Boer | B60K 28/06 |
| 2020/0339133 A1* | 10/2020 | Olsson | B60W 40/08 |
| 2021/0007658 A1* | 1/2021 | Kinnunen | A61B 5/742 |
| 2023/0211780 A1* | 7/2023 | Tanaka | B60W 30/0956 |
| | | | 340/576 |

FOREIGN PATENT DOCUMENTS

| | | |
|---|---|---|
| KR | 10-1602265 B1 | 3/2016 |
| KR | 2016-0075203 A | 6/2016 |

* cited by examiner

VEHICLE AND METHOD OF CONTROLLING THE SAME

CROSS REFERENCE TO RELATED APPLICATIONS

This application is based on and claims priority under 35 U.S.C. § 119 to Korean Patent Application No. 10-2020-0139453, filed on Oct. 26, 2020 in the Korean Intellectual Property Office, the disclosure of which is incorporated herein by reference.

BACKGROUND

1. Field

The present disclosure relates to a vehicle and a method of controlling the same that are capable of providing an alarm by determining a state of risk of a user.

2. Description of the Related Art

In the automobile industry, Driver Attention Warning (DAW) technology started in the late 2000s, and in the early 2010s has developed in the form of detecting inattentiveness through a pattern of vehicle behavior and issuing a warning on a cluster alone. Since then, with development of camera technology, the DAW technology is provided with Driving State Warning (DSW) technology that enables more direct warning by recognizing the driver's face. However, as Forward Collision-Avoidance Assist (FCA) became legal, DAW has a great advantage in terms of cost reduction, and it is expected to be applicable to mass-production on a regular basis for vehicle models.

The present technology applies additional information, such as smartphone use or sleeping time, to the DAW technology in which inattentiveness is determined only from controlled area network (CAN) signals, thereby supplementing the indirect inattentiveness detection, which is fundamentally shown in the DAW technology.

SUMMARY

The present disclosure provides a vehicle and a method of controlling the same that may determine a risk state of the user by classifying the state of a user into a plurality of stages, and assigning a different weight according to a risk value corresponding to each stage to each driving state of the value, and provide an alarm.

Additional aspects of the disclosure will be set forth in part in the description which follows and, in part, will be obvious from the description, or may be learned by practice of the disclosure.

According to an aspect of the disclosure, there is provided a vehicle including a communicator configured to receive sleeping time data of a user and terminal usage data of the user from a user terminal, a first sensor configured to acquire image data regarding a surrounding of the vehicle, a second sensor configured to acquire driving time data of the vehicle and heading direction data of the vehicle; an alarm, a controller configured to acquire relax data of the user based on the sleeping time data and the driving time data, calculate a risk value based on at least one of the sleeping time data, the terminal usage data, the relax data, or the driving time data, classify a fatigue state of the user into a plurality of risk types based on the risk value, identify a plurality of vehicle driving states based on the image data regarding the surrounding of the vehicle and the heading direction data of the vehicle, and assign a different weight to each of the vehicle driving states according to the risk type to determine whether the user is in a risk state, and upon determining that the user is in a risk state, output a control signal to provide a risk alarm through the alarm.

The controller may be configured to assign the sleeping time data with a risk level and assign the driving time data with a risk level that is lower than the risk level assigned to the sleeping time data, and calculate the risk value based on the user sleeping time data assigned with the risk level and the driving time data assigned with the risk level.

The controller may be configured to assign the user relax time data with a risk level and assign the driving time data with a risk level that is lower than the risk level assigned to the user relax time data, and calculate the risk value based on the user relax data assigned with the risk level and the driving time data assigned with the risk level.

The controller, upon determining that, based on the terminal usage data, the user terminal is activated by receiving an input command of the user while driving, or that the input command of the user is detected within a predetermined input time after the user terminal is activated without an input by the user, may be configured to acquire count data and usage time data regarding a number of times that a specific function of the user terminal is commanded for a predetermined manipulation time from a point in time when the input command is received from the user, and calculate the risk value based on the acquired count data and the usage time data.

The controller may be configured to output a control signal to provide the alarm when the user terminal receives the input command for a time exceeding a predetermined reference time from a point in time when the input command is received.

The controller may be configured to, based on the image data of the surrounding of the vehicle and the heading direction data of the vehicle, acquire lateral moving distance data of the vehicle with respect to a lane, and assign the lateral moving distance data with a different weight according to the type to determine a risk state of the user.

The controller may be configured to, based on the image data of the surrounding of the vehicle and the heading direction data of the vehicle, acquire line crossing distance data of the vehicle, and assign the line crossing distance data with a different weight according to the risk type to determine a risk state of the user.

The controller may be configured to, based on the image data of the surrounding of the vehicle and the heading direction data of the vehicle, acquire steering wheel turning angle data of the vehicle, and assign the steering wheel turning angle data and the lateral moving distance data with a different weight according to the risk type to determine a risk state of the user.

The controller may be configured to, based on the lateral moving distance data, acquire lateral direction changing number data regarding a number of times that the vehicle switches a lateral direction for a predetermined switching time, and assign the lateral direction changing number data with a different weight according to the risk type to determine a risk state of the user.

According to another aspect of the disclosure, there is provided a method of controlling a vehicle, the method including receiving sleeping time data of a user and terminal usage data of the user from a user terminal, acquiring image data regarding a surrounding of the vehicle, acquiring driving time data of the vehicle and heading direction data of the vehicle, acquiring relax data of the user based on the sleeping time data and the driving time data, calculating a risk value based on at least one of the sleeping time data, the terminal usage data, the relax data, or the driving time data, classifying a fatigue state of the user into a plurality of risk types based on the risk value, identifying a plurality of vehicle driving states based on the image data regarding the surrounding of the vehicle and the heading direction data of the vehicle, and assigning a different weight to each of the vehicle driving states according to the risk type to determine whether the user is in a risk state, and upon determining that the user is in a risk state, outputting a control signal to provide a risk alarm.

The calculating of the risk value may include assigning the sleeping time data with a risk level and assigning the driving time data with a risk level that is lower than the risk level assigned to the sleeping time data, and calculating the risk value based on the user sleeping time data assigned with the risk level and the driving time data assigned with the risk level.

The calculating of the risk value may include assigning the user relax time data with a risk level and assigning the driving time data with a risk level that is lower than the risk level assigned to the user relax time data, and calculating the risk value based on the user relax data assigned with the risk level and the driving time data assigned with the risk level.

The calculating of the risk value may include upon determining that, based on the terminal usage data, the user terminal is activated by receiving an input command of the user while driving, or that the input command of the user is detected within a predetermined input time after the user terminal is activated without an input by the user, acquiring count data and usage time data regarding a number of times that a specific function of the user terminal is commanded for a predetermined manipulation time from a point in time when the input command is received from the user; and calculating the risk value based on the acquired count data and the usage time data.

The providing of the risk alarm may include providing the risk alarm when the user terminal receives the input command for a time exceeding a predetermined reference time from a point in time when the input command is received.

The determining of the risk state of the user may include, based on the image data of the surrounding of the vehicle and the heading direction data of the vehicle, acquiring lateral moving distance data of the vehicle with respect to a lane, and assigning the lateral moving distance data with a different weight according to the risk type.

The determining of the risk state of the user may include, based on the image data of the surrounding of the vehicle and the heading direction data of the vehicle, acquiring line crossing distance data of the vehicle, and assigning the line crossing distance data with a different weight according to the risk type.

The determining of the risk state of the user may include, based on the image data of the surrounding of the vehicle and the heading direction data of the vehicle, acquiring steering wheel turning angle data of the vehicle, and assigning the steering wheel turning angle data and the lateral moving distance data with a different weight according to the risk type.

The determining of the risk state of the user may include, based on the lateral moving distance data, acquiring lateral direction changing number data regarding a number of times that the vehicle switches a lateral direction for a predetermined switching time, and assigning the lateral direction changing number data with a different weight according to the risk type.

BRIEF DESCRIPTION OF THE FIGURES

These and/or other aspects of the disclosure will become apparent and more readily appreciated from the following description of the embodiments, taken in conjunction with the accompanying drawings of which.

DETAILED DESCRIPTION

Like numerals refer to like elements throughout the specification. Not all elements of embodiments of the present disclosure will be described, and description of what are commonly known in the art or what overlap each other in the embodiments will be omitted. The terms as used throughout the specification, such as "~ part", "~ module", "~ member", "~ block", etc., may be implemented in software and/or hardware, and a plurality of "~ parts", "~ modules", "~ members", or "~ blocks" may be implemented in a single element, or a single "~ part", "~ module", "~ member", or "~ block" may include a plurality of elements.

It will be further understood that the term "connect" or its derivatives refer both to direct and indirect connection, and the indirect connection includes a connection over a wireless communication network.

It will be further understood that the terms "comprises" and/or "comprising," when used in this specification, specify the presence of stated features, integers, steps, operations, elements, and/or components, but do not preclude the presence or addition of one or more other features, integers, steps, operations, elements.

In the specification, it will be understood that, when a member is referred to as being "on/under" another member, it may be directly on/under the other member, or one or more intervening members may also be present.

Although the terms "first," "second," "A," "B," etc. may be used to describe various components, the terms do not limit the corresponding components, but are used only for the purpose of distinguishing one component from another component.

As used herein, the singular forms "a," "an" and "the" are intended to include the plural forms as well, unless the context clearly indicates otherwise.

Reference numerals used for method steps are just used for convenience of explanation, but not to limit an order of the steps. Thus, unless the context clearly dictates otherwise, the written order may be practiced otherwise.

Hereinafter, the principles and embodiments of the disclosure will be described with reference to the accompanying drawings.

Figure 1:
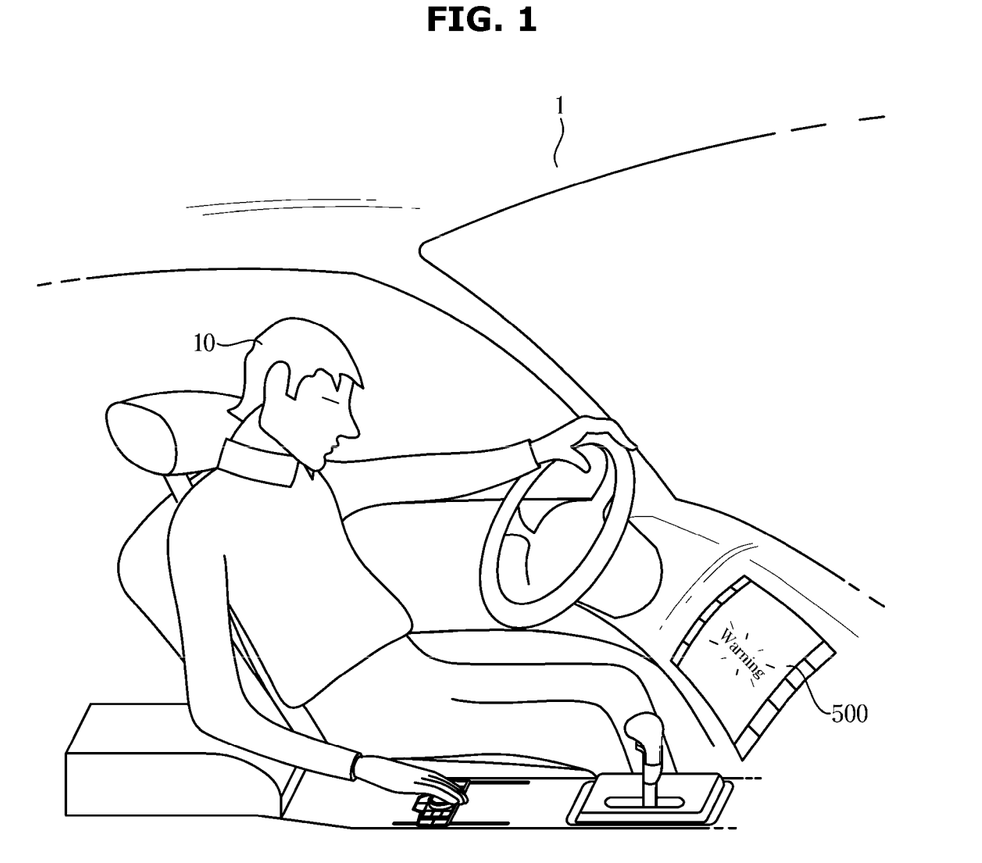
FIG. 1 is a diagram illustrating an operation of providing an alarm by determining that a user is in a risk state according to an embodiment.
Figure 2:
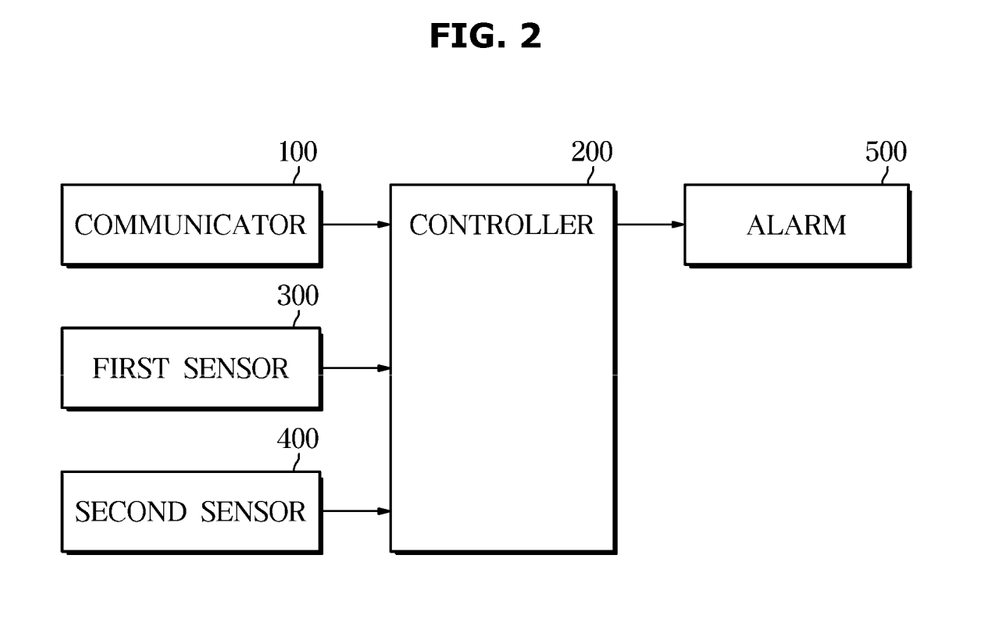
FIG. 2 is a control block diagram according to an embodiment.

FIG. 1 is a diagram illustrating an operation of providing an alarm by determining that a user is in a risk state according to an embodiment, and FIG. 2 is a control block diagram according to an embodiment.

Referring to FIGS. 1 and 2, a vehicle 1 includes a communicator 100 configured to receive sleeping time data of a user 10 and terminal usage data of the user 10 from a user terminal, a first sensor 300 configured to acquire image data regarding a surrounding of the vehicle 1, a second sensor 400 configured to acquire driving time data of the vehicle 1 and heading direction data of the vehicle 1, an alarm 500, and a controller 200. The controller 200 is configured to acquire relax data of the user 10 based on the sleeping time data and the driving time data, calculate a risk value based on at least one of the sleeping time data, the terminal usage data, the relax data, and the driving time data, classify a fatigue state of the user 10 into a plurality of risk types based on the risk value, identify a plurality of vehicle driving states based on the image data regarding the surrounding of the vehicle 1 and the heading direction data of the vehicle 1, and assign a different weight to each of the vehicle driving states according to the risk type to determine whether the user 10 is in a risk state, and upon determining that the user 10 is in a risk state, output a control signal to provide a risk alarm through the alarm.

The communicator 100 may receive the sleeping time data of the user 10 and the terminal usage data of the user 10 from the user terminal. The sleeping time data of the user 10 may refer to data representing a sleeping time of the user 10 through the user terminal. The terminal usage data may refer to usage data about using the user terminal by the user 10. The first sensor 300 may refer to a camera. The driving time data of the vehicle 1 may refer to data recording the time for which the user 10 drives the vehicle 1. The heading direction data of the vehicle 1 may refer to a change in the direction of the vehicle 1 that has been driving in a straight line. For example, a lane may exist, and when the vehicle 1 moves to the left or right with respect to the lane, the amount of the movement angle may refer to heading direction data. The alarm 500 may refer to a device that provides an alarm notification through a cluster or an Audio Video Navigation (AVN) system, or a device that provides an alarm notification to the user 10 in various other ways. The relax data may refer to a value obtained by subtracting a sleeping time and a driving time of the vehicle 1 from 24 hours. The risk value may refer to a value obtained by quantifying the degree of fatigue that the user 10 feels while driving. The calculating of the risk value may refer to considering at least one from sleeping time, terminal usage time, relax time, and driving time. The calculating of the risk value may be performed by assigning a different risk level to each of the sleeping time, terminal usage time, relax time, and driving time.

The risk level may refer to a value assigned to sleeping time data, driving time data, relax data, and user terminal usage data. The risk value may be calculated by assigning a different or same risk level to each of the sleeping time data, the driving time data, the relax data, and the user terminal usage data. The risk value may be calculated by assigning the sleeping time data with a risk level and assigning the driving time data with a risk level lower than that assigned to the sleeping time data, and using the sleeping time data assigned with the risk level and the driving time data assigned with the risk level. For example, the size of the risk value may be calculated by multiplying sleeping time data by a risk level of 2 and multiplying the driving time data by a risk level of 1.5.

The assigning of the risk level may be arbitrarily designated by the user 10, or may be performed based on a general calculation method. In addition, the relax data of the user 10 may be assigned with a risk level higher than that assigned to the driving time data, and the risk value may be calculated based on the relax data assigned with the risk level and the driving time data assigned with the risk level. In this case, the relax data may be assigned with a risk level higher than that assigned to the sleeping time data. In addition, upon determining that, based on the terminal usage data, the user terminal is activated by receiving an input command of the user 10 while driving, or that the input command of the user 10 is detected within a predetermined input time after the user terminal is activated without an input by the user 10, the controller 200 may acquire count data and usage time data regarding the number of times that a specific function of the user terminal is commanded for a predetermined manipulation time from a point in time when the input command is received from the user, and calculate the risk value based on the acquired count data and the usage time data.

In addition, the controller 200 may provide the risk alarm when the user terminal receives the input command for a time exceeding a predetermined reference time from a point in time when the input command is received. According to the size of the risk value, a plurality of risk types are identified. The risk value may refer to a value finally determined by assigning different risk levels to a plurality of pieces of data. The identifying of the plurality of types may refer to dividing the sizes of the risk value into ranges to distinguish the plurality of types. For example, under the assumption that a user sleeping time is assigned with a risk level of −4, a relaxing time is assigned with a risk of −8, a driving time is assigned with a risk level of 2, and a default risk level is 50, when the user takes a sleeping time of 2 hours, a relaxing time of 1 hour, and a driving time of 10 hours, the risk value is obtained by multiplying the time value by the risk level of each data and adding the multiplication value to the default risk level, that is, the risk value is obtained as 54. When the risk types are divided into three types according to the risk value, e.g., risk type 1 for a risk value smaller than or equal to 50, risk type 2 for a risk value larger than 50 and smaller than 70, and risk type 3 for a risk value larger than or equal to 70 and smaller than 90, the fatigue state of the user belongs to risk type 2. Based on the result, a weight corresponding to risk type 2 is assigned to the driving state of the vehicle to determine a risk state.

The method of calculating the risk value may be set in various ways, and the types according to the ranges of the risk value may be set in various ways. In addition, the method for assigning weights may be set in various ways. Based on the image data of the surrounding of the vehicle 1 and the heading direction data of the vehicle 1, a plurality of driving states of the vehicle 1 may be distinguished. The driving state of the vehicle 1 will be described in detail below. In this case, each driving state of the vehicle 1 is assigned with a different weight according to the risk type so that the risk state of the user 10 may be determined. The risk state may refer to a state in which an alarm needs to be provided to notify the user 10 of a risk. The weight may refer to assigning a predetermined value to a reference value for determining whether the user 10 is in a risk state in each driving state of the vehicle 1. For example, when the user 10 is in a driving state of the vehicle 1 in which the vehicle 1 is moving in the lateral direction without manipulation of the steering wheel, the reference value may be an amount moved by the vehicle in the lateral direction without manipulation of the steering wheel. In this case, based on a value of the reference value assigned with a weight, if the user 10 corresponds to a risk type with a very high risk value, a lateral movement of 1 M may be determined as a risk state and if the user 10 corresponds to a risk type with an intermediate risk value, a lateral movement of 1.5 M may be determined as a risk state, and if the user 10 corresponds to a risk type with a low risk value, a lateral movement of 2 M may serve as a reference that determines a risk state. That is, in a driving state in which the vehicle 1 moves in the lateral direction without manipulating the steering wheel, the reference value may be the lateral moving distance, and the weight may refer to a correction value that is a constant value assigned to the reference value for determining a notification state. The reference value and the weight may be different variables depending on the driving state of the vehicle 1, and the value and the degree to which the weight is assigned may also be different depending on the driving state of the vehicle 1.

The controller 200 is a processor that controls the overall operation of the vehicle 1 and may be a processor of an electronic control unit (ECU) that controls the overall operation of the power system. In addition, the controller 200 may control operations of various modules, devices, etc. built into the vehicle 1. According to an embodiment, the controller 200 may control the operation of each component by generating control signals for controlling various modules, devices, etc. built in the vehicle 1.

In addition, the controller 200 may include a memory in which programs that perform operations described above and below and various data related thereto are stored, and a processor that executes programs stored in the memory. In addition, the controller 200 may be integrated into a System On Chip (SOC) built into the vehicle 1 and may be operated by a processor. However, since a plurality of SOCs may be embedded in the vehicle 1 rather than one SOC, the controller 200 is not limited to being integrated into only one SOC.

The communicator may include one or more components that enable communication with an external device, and may include at least one of a short-range communication module and a wireless communication module.

The short-range communication module may include various short-range communication modules that transmit and receive signals using a wireless communication network in a short range, such as a BLUETOOTH® module, an infrared communication module, a radio frequency identification (RFID) communication module, a wireless local access network (WLAN) communication module, an NFC communication module, and a ZIGBEE® communication module.

The wireless communication module may include wireless communication modules supporting various wireless communication methods, such as a Wifi module, a wireless broadband module (Wibro) module, a global system for mobile communication (GSM) module, a code division multiple access (CDMA) module, a wideband code division multiple access (WCDMA) module, a universal mobile telecommunications system (UMTS) module, a time division multiple access (TDMA) module, a long term evolution (LTE) module, and the like.

The wireless communication module may include a wireless communication interface including an antenna and a transmitter for transmitting signals. In addition, the wireless communication module may further include a signal converting module for converting a digital control signal output from the control unit through the wireless communication interface into an analog type wireless signal under the control of the control unit.

The wireless communication module may include a wireless communication interface including an antenna and a receiver for receiving signals. In addition, the wireless communication module may further include a signal converting module for demodulating an analog type wireless signal received through the wireless communication interface into a digital control signal.

The controller 200 may be implemented through at least one type of storage medium among from a flash memory type, a hard disk type, a multimedia card micro type, a card type memory (for example, a SD or XD memory), a Random Access Memory (RAM), a Static Random Access Memory (SRAM), a Read-Only Memory (ROM), Electrically Erasable Programmable Read-Only Memory (EEPROM), a Programmable Read-Only Memory (PROM), a magnetic memory, a magnetic disk, and an optical disk. However, it is not limited thereto, and the controller 200 may be implemented in any other form known in the art.

At least one component may be added or omitted to correspond to the performances of the components of the apparatus shown in FIG. 2. In addition, the mutual positions of the components may be changed to correspond to the performance or structure of the system.

Some of the components shown in FIG. 2 may refer to a software component and/or a hardware component, such as a Field Programmable Gate Array (FPGA) and an Application Specific Integrated Circuit (ASIC).

Figure 3:
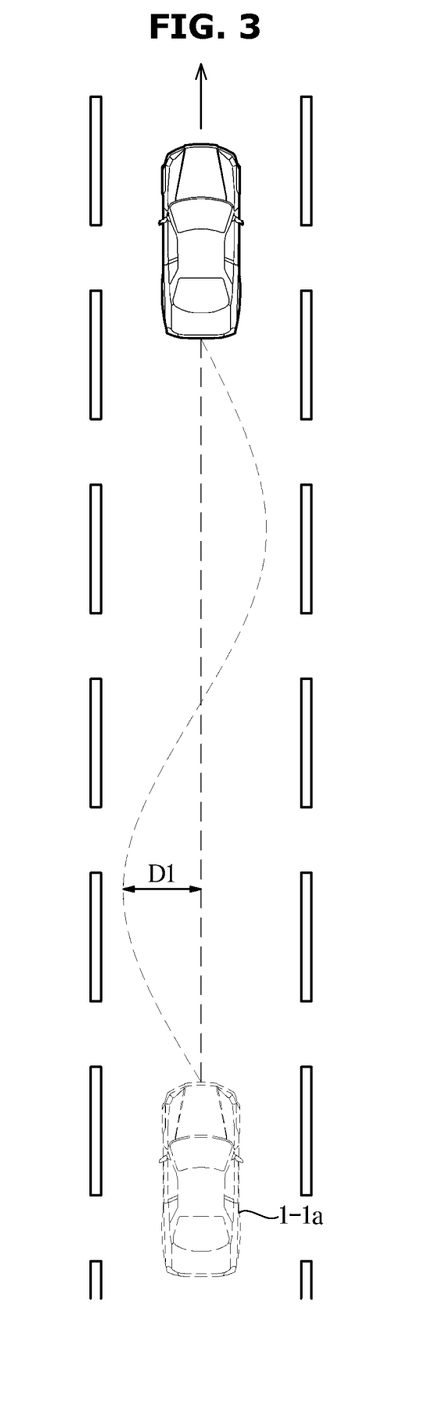
FIG. 3 is a diagram illustrating an operation of determining a risk state of a user by assigning a lateral moving distance of a vehicle with different weights according to types, according to an embodiment.

FIG. 3 is a diagram illustrating an operation of determining a risk state of a user by adding a different weight according to a type to a lateral moving distance of a vehicle according to an embodiment.

Referring specifically to FIG. 3, data of a lateral moving distance D1 is acquired with respect to a lane based on the image data of the surrounding of a vehicle 1-1a and the heading direction data of the vehicle 1-1a, and different weights are assigned to the data of the lateral moving distance D1 according to types. For example, when the types are divided into three types according to the risk value, even if the lateral moving distance D1 of the vehicle 1-1a is the same, the risk state may be determined differently depending on the type. For example, according to the types, a lateral moving distance D1 of 3 meters, a lateral moving distance D1 of 2 meters, and a lateral moving distance D1 of 1 meter may be respectively determined as a risk state in which the user is in danger. In this case, the user may move 1.5 meters in the lateral direction, and if the user state belongs to the second or third type depending on the risk value, that is, depending on the risk value state, the user may be determined to be in a risk state, but if the user state corresponds to the first type, the user may not be determined in a risk state.

Figure 4:
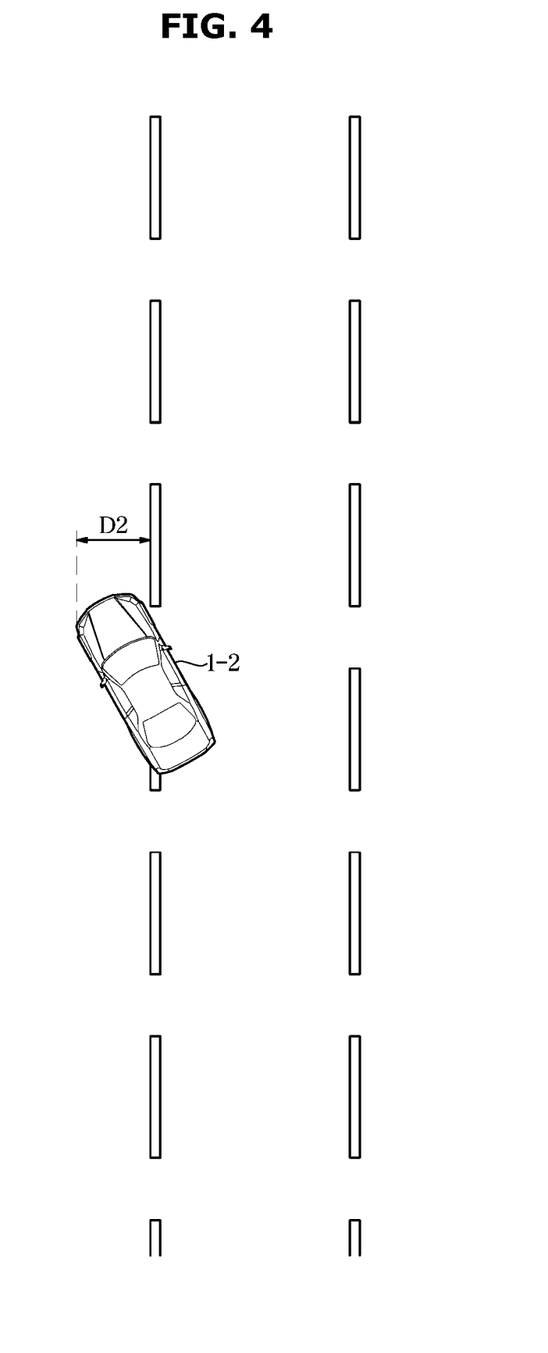
FIG. 4 is a diagram illustrating an operation of determining a risk state of a user by assigning a line crossing distance of a vehicle with different weights according to types, according to an embodiment.

FIG. 4 is a diagram illustrating an operation of determining a risk state of a user by assigning a line crossing distance of a vehicle with different weights according to types, according to an embodiment.

Referring specifically to FIG. 4, the controller may be configured to, based on the image data of the surrounding of a vehicle 1-2 and the heading direction data of the vehicle 1-2, acquire line crossing distance data of the vehicle 1-2, and assign the line crossing distance data with different weights according to types to determine the risk state of the user. For example, if the user of the vehicle 1-2 corresponds to a risk type having a highest risk value, even if a line crossing distance D2 is small, it is determined as a risk state immediately and a risk alarm needs to be provided. If the user of the vehicle 1-2 corresponds to a risk type with a medium risk value, a risk alarm may be provided in response to the line crossing distance D2 being longer than that in the type with the highest risk value, and if the user of the vehicle 1-2 corresponds to a risk type with a lowest risk value, a risk state may be determined and a risk alarm may be provided in response to the line crossing distance D2 being longer than that in the type with a medium risk value.

Figure 5:
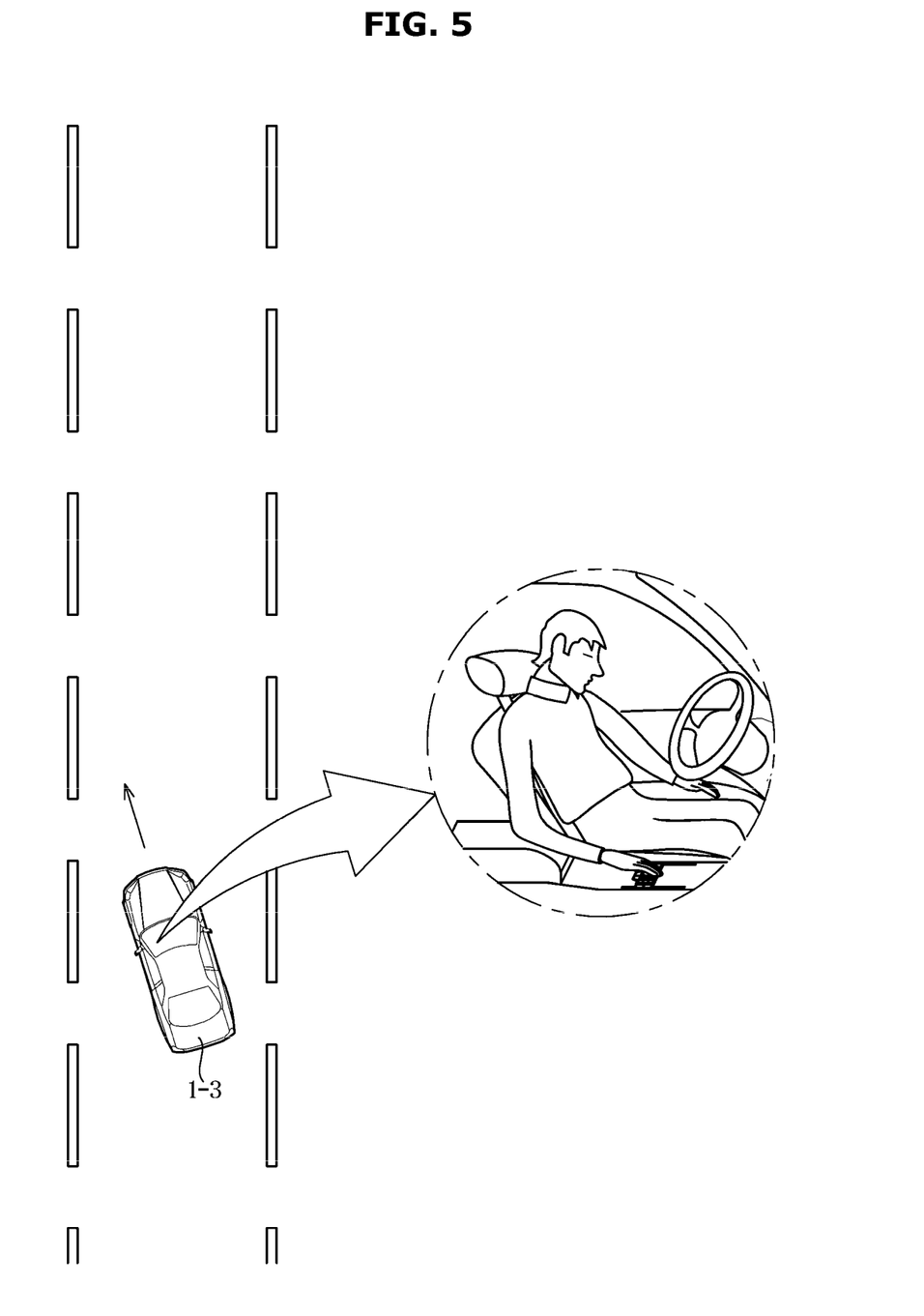
FIG. 5 is a diagram illustrating an operation of determining a risk state of a user when a vehicle moves in the lateral direction without a user manipulating a steering wheel according to an embodiment.

FIG. 5 is a diagram illustrating an operation of determining a risk state of a user when a vehicle moves in the lateral direction without a user manipulating a steering wheel according to an embodiment.

Referring specifically to FIG. 5, if a heading direction of a vehicle 1-3 corresponds to a lateral direction rather than a straightforward direction with respect to the lane without manipulation of the steering wheel, the controller may determine that the risk value is high. Even in this case, the level for determining that an alarm needs to be provided may vary depending on the amount moved by the vehicle 1-3 in the lateral direction. That is, types are determined according to the risk value of the user, and when the vehicle 1-3 is moving in the lateral direction without the user manipulating the steering wheel, different weights are assigned according to the risk types so that an alarm is issued according to the amount moved by the vehicle in the lateral direction. For example, even if the vehicle 1-3 has not moved in the lateral direction as much as shown in FIG. 3, if the lateral movement has been performed without the user manipulating the steering wheel, the lateral movement may be a factor to be considered when determining that the user is in a risk state. In this case, even if the vehicle does not move in the lateral direction as much as shown in FIG. 3, if the user is classified as a risk type with a high risk value, it is determined that the user is in a risk state in response to the vehicle being moved in the lateral direction to a certain extent without manipulating the steering wheel, and a risk alarm may be provided. If the user is classified as a risk type with a low risk value, it is determined that the user is in a risk state in response to the vehicle being moved in the lateral direction in an amount larger than that in the risk type with a high risk value and a risk alarm may be provided. Determining the steering wheel operation may be provided using a steering sensor in the vehicle.

Figure 6:
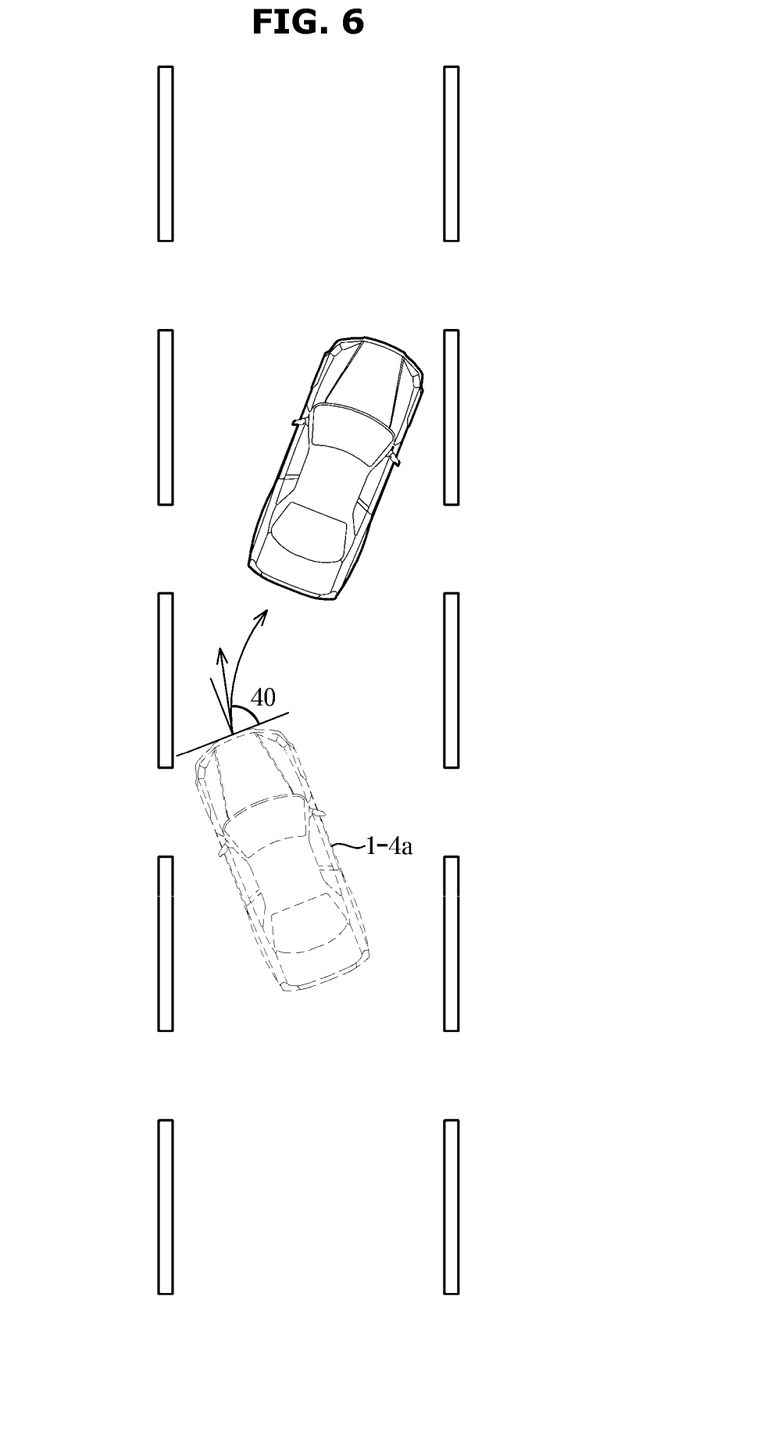
FIG. 6 is a diagram illustrating an operation of determining a risk state of a user by assigning a steering wheel turning angle of a vehicle with different weights according to types according to an embodiment.

FIG. 6 is a diagram illustrating an operation of determining a risk state of a user by assigning a steering wheel turning angle of a vehicle with different weights according to types according to an embodiment.

Referring specifically to FIG. 6, the controller may acquire data of a steering wheel turning angle 40 of a vehicle 1-4a based on the image data of the surrounding of the vehicle 1-4a of the vehicle 1-4a and the heading direction data of the vehicle 1-4a, and may assign the steering wheel turning angle and the lateral moving data of the vehicle 1-4a with different weights according to types to determine the risk state of the user. In this case, when the steering wheel turning angle 40 of the vehicle 1-4a is greater than or equal to a reference angle determined according to the type, the user may be determined to be in a risk state. In addition, different weights are assigned according to the types based on the risk value so that the user's state may be determined to be a risk state. For example, in the case of a risk type with a high risk value, even if the angle of the steering wheel is turned a little, it may be determined as a risk state and an alarm may be provided.

Figure 7:
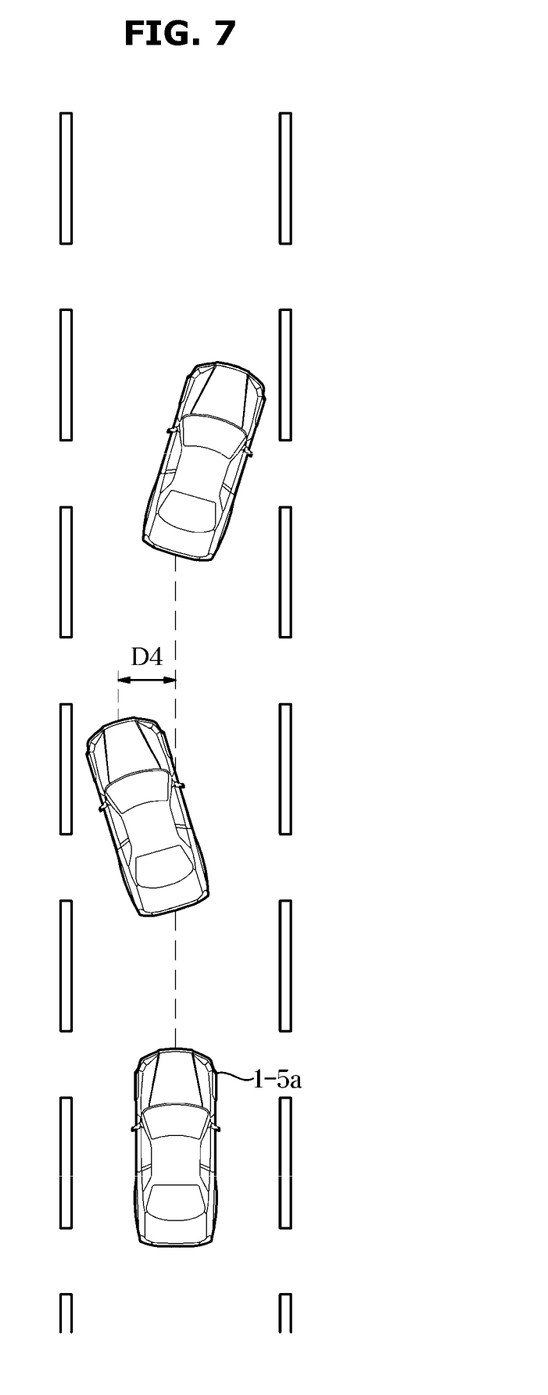
FIG. 7 is a diagram illustrating an operation of determining a risk state of a user by assigning the lateral direction changing number of a vehicle with different weights according to types, according to an embodiment.

FIG. 7 is a diagram illustrating an operation of determining a risk state of a user by assigning the lateral direction changing number of a vehicle with different weights according to types, according to an embodiment.

Referring specifically to FIG. 7, the controller may be configured to, based on the lateral moving data, acquire lateral direction changing number data regarding the number of times that the vehicle switches the lateral direction within a predetermined switching time, and assign the lateral direction changing number data with different weights according to the types to determine the risk state of the user. For example, even if the moving distance D4 in the lateral direction of the vehicle is shorter than that shown in FIG. 3, if it is recognized that the steering wheel of the vehicle is continuously turned while changing the direction, the state of the user may be determined as a risk state. In this case, if the types according to the risk value are divided into three types, an alarm may be provided when the number of times of switching the lateral direction is two times for the type with a highest risk value, when the number of times of switching the lateral direction is three times for the type with a middle risk value, and when the number of times of switching the lateral direction is four times for the type with a lowest risk value.

Figure 8:
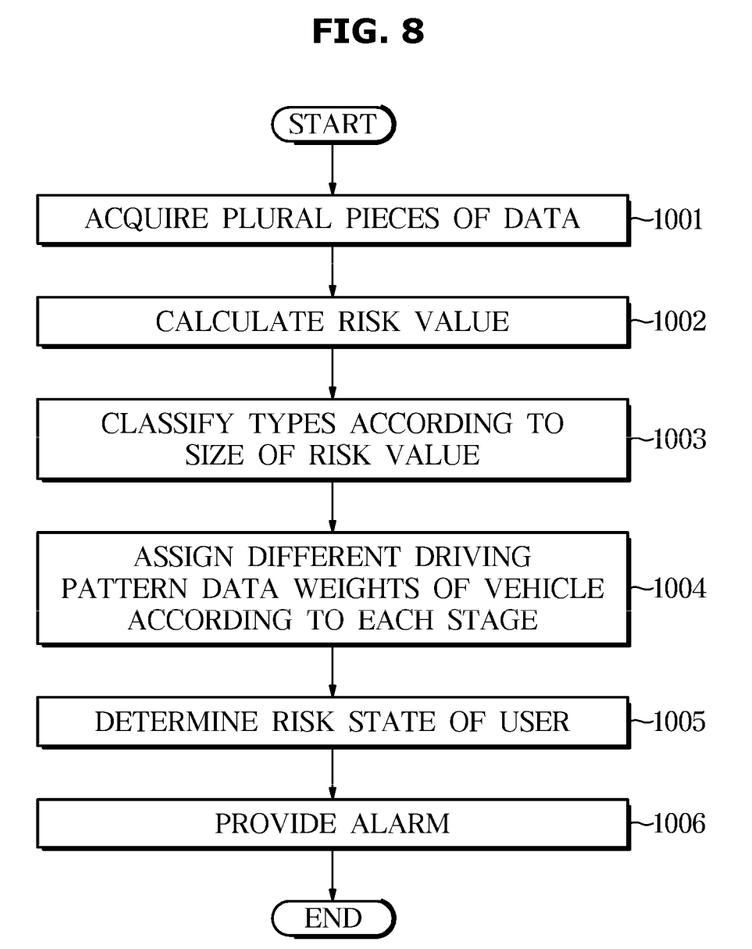
FIG. 8 is a flowchart according to an embodiment.

FIG. 8 is a flowchart according to an embodiment.

Referring specifically to FIG. 8, the controller may acquire a plurality of pieces of data at 1001. As described above, the plurality of pieces of data may include the sleeping time data of the user, the terminal usage data of the user, the image data of the surrounding of the vehicle, the driving time data of the vehicle, and the heading direction data of the vehicle, and may include relax data. Thereafter, the controller may calculate a risk value at 1002. As described above, the risk value may refer to a value obtained by quantifying the degree of fatigue felt by the user. Thereafter, types may be classified according to the size of the risk value at 1003. In the drawings, the type may refer to a risk type, and may be largely divided into three types, that is, a first state, a second stage, and a third stage. The division may also refer to dividing the user's fatigue state into a plurality of types based on the risk value. Thereafter, driving pattern data of the vehicle may be assigned with different weights according to each stage at 1004. In this case, image data may be considered together with the vehicle driving pattern. Thereafter, a risk state of the user may be determined at 1005, and if it is determined that the user is in a risk state, an alarm may be provided at 1006. In the drawings, an alarm may refer to a risk alarm.

Meanwhile, the disclosed embodiments may be embodied in the form of a recording medium storing instructions executable by a computer. The instructions may be stored in the form of program code and, when executed by a processor, may generate a program module to perform the operations of the disclosed embodiments. The recording medium may be embodied as a computer-readable recording medium.

The computer-readable recording medium includes all kinds of recording media in which instructions which may be decoded by a computer are stored, for example, a Read Only Memory (ROM), a Random Access Memory (RAM), a magnetic tape, a magnetic disk, a flash memory, an optical data storage device, and the like.

As is apparent from the above, the vehicle according to the embodiment and the method of controlling the same determine a risk state of the user by classifying the state of a user into a plurality of stages and assigning a different weight according to a risk value corresponding to each stage to each driving state of the vehicle to, so that the safety of the user can be improved.

Although embodiments of the present disclosure have been described for illustrative purposes, those skilled in the art will appreciate that various modifications, additions and substitutions are possible, without departing from the scope and spirit of the disclosure. Therefore, embodiments of the present disclosure have not been described for limiting purposes.

The invention claimed is:

1. A vehicle comprising:
a communicator configured to receive sleeping time data of a user and terminal usage data of the user from a user terminal;
a first sensor configured to acquire image data regarding a surrounding of the vehicle;
a second sensor configured to acquire driving time data of the vehicle and heading direction data of the vehicle;
an alarm; and
a controller configured to:
acquire relax data of the user from a twenty-four hour period based on the sleeping time data and the driving time data;
calculate a risk value based on at least one of the sleeping time data, the terminal usage data, the relax data, or the driving time data;
classify a fatigue state of the user into a plurality of risk types based on the risk value;
identify a plurality of vehicle driving states based on the image data regarding the surrounding of the vehicle and the heading direction data of the vehicle; and
assign a different weight to each of the vehicle driving states according to the risk type to determine whether the user is in a risk state, and upon determining that the user is in a risk state, output a control signal to the alarm;
wherein the alarm is configured to be activated by the controller upon the determination that the user is in a risk state;
wherein the controller is further configured to, based on the image data of the surrounding of the vehicle and the heading direction data of the vehicle, acquire lateral moving distance data of the vehicle with respect to a lane, and assign the lateral moving distance data with a different weight according to the risk type to determine a risk state of the user; and
wherein the controller is further configured to assign a risk level to at least one of the sleeping time data, the terminal usage data, the relax data, and the driving time data, to generate at least one multiplied result by multiplying the data to which the risk level has been assigned among the sleeping time data, the terminal usage data, the relax data, and the driving time data with the assigned risk level, and to calculate the risk value based on adding the at least one multiplied result to a baseline risk level.

2. The vehicle of claim 1, wherein the controller is further configured to:
assign the sleeping time data with a risk level and assign the driving time data with a risk level that is lower than the risk level assigned to the sleeping time data; and
calculate the risk value based on the user sleeping time data assigned with the risk level and the driving time data assigned with the risk level.

3. The vehicle of claim 1, wherein the controller is further configured to:
assign the relax data of the user with a risk level and assign the driving time data with a risk level that is lower than the risk level assigned to the user relax time data; and
calculate the risk value based on the user relax data assigned with the risk level and the driving time data assigned with the risk level.

4. The vehicle of claim 1, wherein the controller, upon determining that, based on the terminal usage data, the user terminal is activated by receiving an input command of the user while driving, or that the input command of the user is detected within a predetermined input time after the user terminal is activated without an input by the user, is configured to:
acquire count data and usage time data regarding a number of times that a specific function of the user terminal is commanded for a predetermined manipulation time from a point in time when the input command is received from the user, and calculate the risk value based on the acquired count data and the usage time data.

5. The vehicle of claim 4, wherein the controller is further configured to output the control signal to the risk alarm when the user terminal receives the input command for a time exceeding a predetermined reference time from a point in time when the input command is received.

6. The vehicle of claim 1, wherein the controller is further configured to, based on the image data of the surrounding of the vehicle and the heading direction data of the vehicle, acquire line crossing distance data of the vehicle, and assign the line crossing distance data with a different weight according to the risk type to determine a risk state of the user.

7. The vehicle of claim 1, wherein the controller is further configured to, based on the image data of the surrounding of the vehicle and the heading direction data of the vehicle, acquire steering wheel turning angle data of the vehicle, and assign the steering wheel turning angle data and the lateral moving distance data with a different weight according to the risk type to determine a risk state of the user.

8. The vehicle of claim 1, wherein the controller is further configured to, based on the lateral moving distance data, acquire lateral direction changing number data regarding a number of times that the vehicle switches a lateral direction for a predetermined switching time, and assign the lateral direction changing number data with a different weight according to the risk type to determine a risk state of the user.

9. A method of controlling a vehicle, the method comprising:
receiving sleeping time data of a user and terminal usage data of the user from a user terminal;
acquiring image data regarding a surrounding of the vehicle;
acquiring driving time data of the vehicle and heading direction data of the vehicle;

acquiring relax data of the user from a twenty-four hour period based on the sleeping time data and the driving time data;

calculating a risk value based on at least one of the sleeping time data, the terminal usage data, the relax data, or the driving time data;

classifying a fatigue state of the user into a plurality of risk types based on the risk value;

identifying a plurality of vehicle driving states based on the image data regarding the surrounding of the vehicle and the heading direction data of the vehicle;

assigning a different weight to each of the vehicle driving states according to the risk type to determine whether the user is in a risk state, and upon determining that the user is in a risk state, outputting a control signal to provide a risk alarm; and activating the risk alarm upon the determination that the user is in the risk state;

wherein the determining of the risk state of the user includes, based on the image data of the surrounding of the vehicle and the heading direction data of the vehicle, acquiring lateral moving distance data of the vehicle with respect to a lane, and assigning the lateral moving distance data with a different weight according to the risk type; and wherein calculating the risk value comprises assigning a risk level to at least one of the sleeping time data, the terminal usage data, the relax data, and the driving time data, generating at least one multiplied result by multiplying the data to which the risk level has been assigned among the sleeping time data, the terminal usage data, the relax data, and the driving time data with the assigned risk level, and calculating the risk value based on adding the at least one multiplied result to a baseline risk level.

10. The method of claim 9, where the calculating of the risk value includes:

assigning the sleeping time data with a risk level and assigning the driving time data with a risk level that is lower than the risk level assigned to the sleeping time data; and calculating the risk value based on the user sleeping time data assigned with the risk level and the driving time data assigned with the risk level.

11. The method of claim 9, where the calculating of the risk value further includes:

assigning the relax data of the user with a risk level and assigning the driving time data with a risk level that is lower than the risk level assigned to the user relax time data; and calculating the risk value based on the user relax data assigned with the risk level and the driving time data assigned with the risk level.

12. The method of claim 9, where the calculating of the risk value further includes:

upon determining that, based on the terminal usage data, the user terminal is activated by receiving an input command of the user while driving, or that the input command of the user is detected within a predetermined input time after the user terminal is activated without an input by the user, acquiring count data and usage time data regarding a number of times that a specific function of the user terminal is commanded for a predetermined manipulation time from a point in time when the input command is received from the user; and calculating the risk value based on the acquired count data and the usage time data.

13. The method of claim 9, wherein the providing of the risk alarm includes providing the risk alarm when the user terminal receives the input command for a time exceeding a predetermined reference time from a point in time when the input command is received.

14. The method of claim 9, wherein the determining of the risk state of the user includes, based on the image data of the surrounding of the vehicle and the heading direction data of the vehicle, acquiring line crossing distance data of the vehicle, and assigning the line crossing distance data with a different weight according to the risk type.

15. The method of claim 9, wherein the determining of the risk state of the user includes, based on the image data of the surrounding of the vehicle and the heading direction data of the vehicle, acquiring steering wheel turning angle data of the vehicle, and assigning the steering wheel turning angle data and the lateral moving distance data with a different weight according to the risk type.

16. The method of claim 9, wherein the determining of the risk state of the user includes, based on the lateral moving distance data, acquiring lateral direction changing number data regarding a number of times that the vehicle switches a lateral direction for a predetermined switching time, and assigning the lateral direction changing number data with a different weight according to the risk type.

* * * * *